(12) United States Patent
Al Sayeed et al.

(10) Patent No.: US 9,882,634 B1
(45) Date of Patent: Jan. 30, 2018

(54) COORDINATED CONNECTION VALIDATION SYSTEMS AND METHODS AMONG MATED TRANSCEIVERS FOR VERIFYING OPTICAL AND DATA PLANE CONNECTIVITY

(71) Applicant: Ciena Corporation, Hanover, MD (US)

(72) Inventors: Choudhury A. Al Sayeed, Gloucester (CA); Marc Veilleux, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 15/270,348

(22) Filed: Sep. 20, 2016

(51) Int. Cl.
*H04B 10/035* (2013.01)
*H04B 10/50* (2013.01)
*H04B 10/66* (2013.01)
*H04B 10/40* (2013.01)

(52) U.S. Cl.
CPC ........... *H04B 10/035* (2013.01); *H04B 10/40* (2013.01); *H04B 10/50* (2013.01); *H04B 10/66* (2013.01)

(58) Field of Classification Search
CPC combination set(s) only.
See application file for complete search history.

(56) References Cited

U.S. PATENT DOCUMENTS

| 8,509,621 | B2 | 8/2013 | Boertjes et al. |
| 9,252,913 | B2 | 2/2016 | Al Sayeed et al. |
| 9,276,696 | B2 | 3/2016 | Al Sayeed et al. |
| 2009/0214221 | A1* | 8/2009 | Li .................... H04B 10/40 398/136 |
| 2013/0177309 | A1* | 7/2013 | El-Ahmadi .......... H04L 1/0057 398/25 |
| 2014/0112658 | A1 | 4/2014 | Hurley et al. |
| 2015/0109140 | A1* | 4/2015 | Probel ................ H03M 7/30 340/855.4 |
| 2015/0117858 | A1 | 4/2015 | Al Sayeed et al. |
| 2016/0099851 | A1 | 4/2016 | Archambault et al. |

* cited by examiner

*Primary Examiner* — David Payne
*Assistant Examiner* — Omar S Ismail
(74) *Attorney, Agent, or Firm* — Clements Bernard Walker PLLC; Christopher L. Bernard; Lawrence A. Baratta, Jr.

(57) ABSTRACT

Systems and methods for connection validation between a pair of mated transceivers implemented in a network element include, responsive to a request for connection validation at a first transceiver of the pair of mated transceivers, performing a first optical loopback test through the first transceiver with a unique trace identifier; responsive to a successful first optical loopback test, providing the unique trace identifier to a second transceiver of the mated transceivers with a request for a second optical loopback test; performing the second optical loopback test through the second transceiver with the unique trace identifier; and, responsive to a successful second optical loopback test, providing the unique trace identifier back to the first transceiver from the second transceiver.

17 Claims, 6 Drawing Sheets

COORDINATED CONNECTION VALIDATION SYSTEMS AND METHODS AMONG MATED TRANSCEIVERS FOR VERIFYING OPTICAL AND DATA PLANE CONNECTIVITY

FIELD OF THE DISCLOSURE

The present disclosure generally relates to optical networking systems and methods. More particularly, the present disclosure relates to coordinated connection validation systems and methods among mated transceivers for verifying optical and data plane connectivity.

BACKGROUND OF THE DISCLOSURE

In optical networking, conventional connection validation for transceivers, transponders, modems, client interfaces, etc. typically includes a loopback test via a Pseudo-Random Binary Sequence (PRBS) to verify connectivity and functionality. However, this conventional approach only validates connectivity on the optical side. In an optical network, connectivity also includes connections between paired or mated transceivers, such as in an optical switch or the like. As described herein, mated transceivers (or transponders, modems, client interfaces, etc.) are in a network element and have connectivity between each other via non-optical connections, e.g., Optical-Electrical-Optical (O-E-O) connectivity over an electrical backplane, midplane, etc. A loopback test for one transceiver does not guarantee that the other transceiver will work fine at the time of traffic propagation due to the missing synchronization between them and also due to the fact that conventional loopback tests do not verify the intermediate O-E-O interface and connectivity. This additional missing synchronous validation may not only cause trouble during the initial traffic turn up over a regenerator path but also create a blind-spot on the concept of assured restoration of layer 0 traffic if that involves any regenerator pair. Similarly, if layer 1 restoration switches take place over two different transceivers, and one transceiver is verified at a certain time, but the other is not, then there are always chances that the layer 1 protection switch may remain unsuccessful due to faults on the other transceiver.

BRIEF SUMMARY OF THE DISCLOSURE

In an exemplary embodiment, a method for connection validation between a pair of mated transceivers implemented in a network element includes, responsive to a request for connection validation at a first transceiver of the pair of mated transceivers, performing a first optical loopback test through the first transceiver with a unique trace identifier; responsive to a successful first optical loopback test, providing the unique trace identifier to a second transceiver of the mated transceivers with a request for a second optical loopback test; performing the second optical loopback test through the second transceiver with the unique trace identifier; and, responsive to a successful second optical loopback test, providing the unique trace identifier back to the first transceiver from the second transceiver. The method can further include, responsive to one or more of a failure in the first optical loopback test, a failure in the providing, and a failure in the second optical loopback test, marking the mated transceivers as blocked for future traffic.

The first transceiver can include a plurality of transmitter/receiver (Tx/Rx) pairs, and wherein the first optical loopback test and the providing can be performed for each of the plurality of Tx/Rx pairs. Each of the plurality of Tx/Rx pairs can transmit a low transmission rate signal, and wherein the second transceiver can transmit a high transmission rate signal. The second transceiver can include a plurality of transmitter/receiver (Tx/Rx) pairs, and wherein the providing can be performed to each of the plurality of Tx/Rx pairs which each perform a separate second optical loopback test. Each of the plurality of Tx/Rx pairs can transmit a low transmission rate signal, and wherein the first transceiver can transmit a high transmission rate signal. The providing can utilize an Optical channel Data Unit with the unique trace identifier to verify the data plane connectivity between the mated transceivers. The mated transceivers can be managed as a single entity for traffic provisioning. The first transceiver and the second transceiver can be each disposed in a same network element with the providing over an electrical interface between the first transceiver and the second transceiver.

In another exemplary embodiment, an apparatus adapted for connection validation between a pair of mated transceivers implemented in a network element includes circuitry adapted to cause performance of a first optical loopback test through the first transceiver with a unique trace identifier responsive to a request for connection validation at a first transceiver of the pair of mated transceivers; circuitry adapted to provide the unique trace identifier to a second transceiver of the mated transceivers with a request for a second optical loopback test responsive to a successful first optical loopback test; circuitry adapted to cause performance of the second optical loopback test through the second transceiver with the unique trace identifier; and circuitry adapted to provide the unique trace identifier back to the first transceiver from the second transceiver responsive to a successful second optical loopback test. The apparatus can further include circuitry adapted to mark the mated transceivers as blocked for future traffic responsive to one or more of a failure in the first optical loopback test, a failure in the providing, and a failure in the second optical loopback test.

The first transceiver can include a plurality of transmitter/receiver (Tx/Rx) pairs, and wherein the first optical loopback test and the providing can be performed for each of the plurality of Tx/Rx pairs. Each of the plurality of Tx/Rx pairs can transmit a low transmission rate signal, and wherein the second transceiver can transmit a high transmission rate signal. The second transceiver can include a plurality of transmitter/receiver (Tx/Rx) pairs, and wherein the circuitry adapted to provide can be configured to provide the unique trace identifier to each of the plurality of Tx/Rx pairs which each perform a separate second optical loopback test. Each of the plurality of Tx/Rx pairs can transmit a low transmission rate signal, and wherein the first transceiver can transmit a high transmission rate signal. The circuitry adapted to provide can utilize an Optical channel Data Unit with the unique trace identifier to verify the data plane connectivity between the mated transceivers. The mated transceivers can be managed as a single entity for traffic provisioning. The first transceiver and the second transceiver can be each disposed in a same network element with the providing over an electrical interface between the first transceiver and the second transceiver.

In a further exemplary embodiment, a network element adapted for connection validation between a pair of mated transceivers includes a plurality of line modules interconnected to one another; and a controller configured to, responsive to a request for connection validation at a first line module of the pair of mated transceivers, perform a first optical loopback test through the first line module with a unique trace identifier, responsive to a successful first optical loopback test, provide the unique trace identifier to a second line module of the mated transceivers with a request for a second optical loopback test, perform the second optical loopback test through the second line module with the unique trace identifier, and, responsive to a successful second optical loopback test, provide a notification to the first line module from the second line module. The controller can be configured to mark the mated transceivers as blocked for future traffic responsive to one or more of a failure in the first optical loopback test and a failure in the second optical loopback test.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, in various exemplary embodiments, the present disclosure relates to coordinated connection validation systems and methods among mated transceivers for verifying optical and data plane connectivity. In particular, the systems and method perform coordinated optical connectivity validation for all transceivers in a mated connection setup as well as concurrently validating data plane connectivity so that a complete mated transceiver pair can be treated as a single grouped entity at any point in time to minimize risk during service turn-up and restoration. In the following descriptions, reference is made to transceivers for illustration purposes and those of ordinary skill in the art will recognize that transceivers can also be transponders, transmitters/receivers, modems, client interfaces, pluggable transceiver, or any optical device. Further, reference is made to Layer 0 which represents an optical layer such as Dense Wave Division Multiplexing (DWDM) or the like, and to Layer 1 which represents a Time Division Multiplexing (TDM) layer such as using Optical Transport Network (OTN) or the like.

Assured restoration is an important requirement for Layer 0 restorations and proactive connection validation on available transmit and receive (Tx/Rx) regenerator banks plays a crucial part. As described herein, a regenerator bank is a pair of mated transceivers which some form of electrical processing between the pair. The electrical processing can include packet switching, TDM switching, OEO conversion, and a combination thereof. Presently regenerator banks are common in long-haul optical transmission and with the increase data rates with a proportionate reduction in reach, deployment of regenerator banks at strategic Optical Add/Drop Multiplexer (OADM) location can be more common among the network service providers. Also, regenerator banks are common at terminal locations where TDM and/or packet switching occur.

Again, conventionally, optical connection validation is run individually on one transceiver at a time at a distinct timeframe primarily at the time of installation, and the network management applications (e.g., Layer 0 and Layer 1 control plane and above) does not have a synchronous, assured view of connection validation status from all paired transceivers at the time of traffic roll-out. As a result of that, conventionally, Layer 0 restoration often fails either due to failure in transceivers, faults on data plane connectivity or due to faulty fiber connections on one of the transceiver cards in the regenerator setup.

The systems and methods describe coordinate connection validation among mated transceiver pair(s) that not only confirm optical connectivity and data-framing capability of each individual transceiver in a mated group but also verify the data plane connectivity and capability between mated transceiver pair(s). With the coordinated effort, all these mated cards can work and report their connection validation status as a single grouped entity at any specific time instant, and avoid possibilities of unseen failures at the time of traffic roll-out.

In an exemplary embodiment, a method, a controller, and a network element are configured to recognizes data plane connectivity or data plane dependency between plurality of broadband cards (i.e., transceiver cards that are paired or mated with each other), wherein, at least one of the broadband cards is a transceiver that is capable of transmitting and receiving traffic over optical signals, and not carrying any live in-service traffic (i.e., the transceiver is dark). The method, controller, and network element coordinates optical and data plane connectivity by propagating unique trace identifiers between mated transceiver cards and over their corresponding optical loopback paths.

Additionally, if any of a regenerator pair (transceiver-transceiver pair) or transponder-client pair fails to sync up with each other in terms of connection validation, the method, controller, and network element can notify a control plane to block those ports, i.e., not to use those traffic ports for future restoration until the fault is resolved. Associated processes can run embedded on the broadband cards, or can run from a local node level controller or from a centralized controller that can coordinate connection validation for a different set of paired cards at any specific instant of time.

Conventional Loopback Testing

Figure 1:
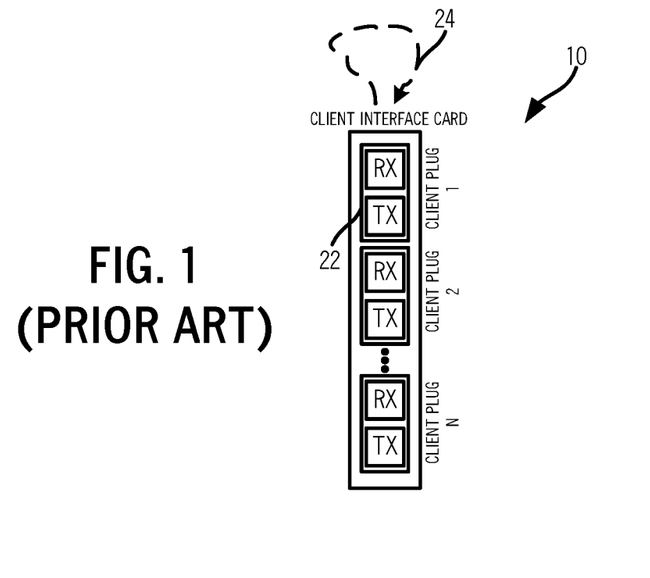
FIG. 1 is a block diagram of a conventional approach to optical loopback connectivity testing in a client interface card.
Figure 2:
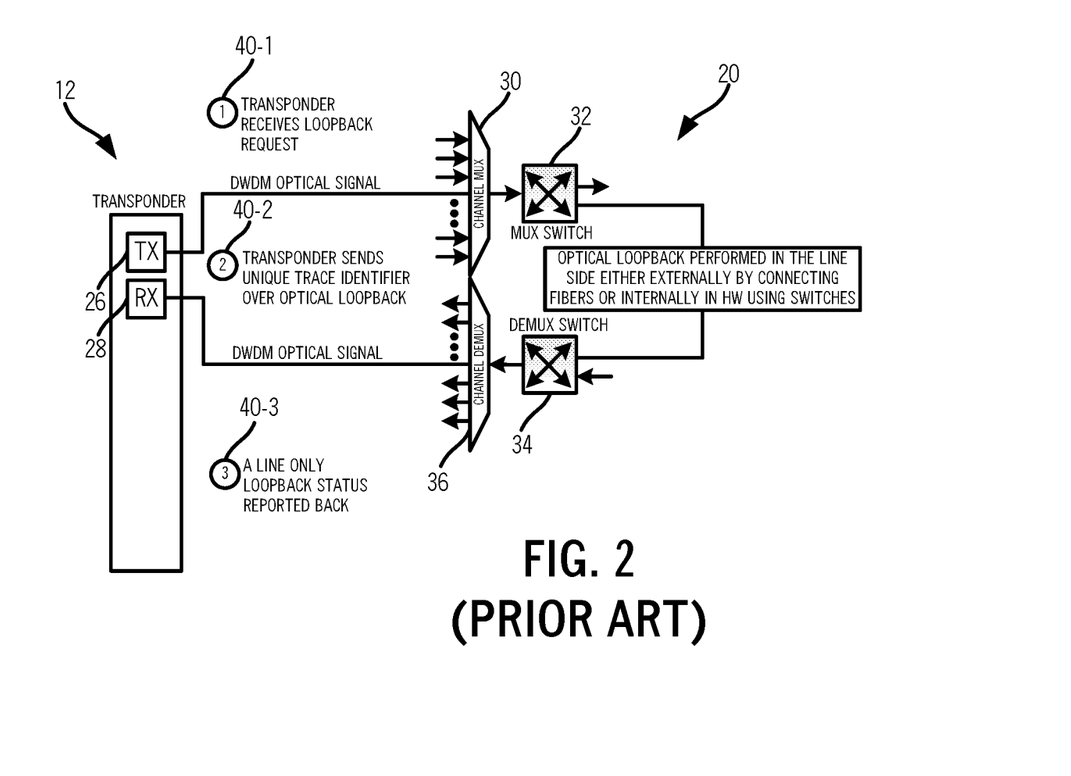
FIG. 2 is a block diagram of a conventional approach to optical loopback connectivity testing in a transponder connected to an optical network.

Referring to FIGS. 1 and 2, in an exemplary embodiment, block diagrams illustrate conventional approaches to optical loopback connectivity testing in a client interface card 10 (FIG. 1) and in a transponder 12 connected to an optical network 20 (FIG. 2). The client interface card 10 and the transponder 12 are examples of transceivers. The client interface card 10 can include one or more ports 22 (Tx/Rx) for interfacing to a client device (e.g., switch, router, etc.). For example, the client interface card 10 can be used for short-range, intra-office connectivity or the like to adjacent network elements. Conventionally, the client interface card 10 performs its own internal loopback test 24 with PRBS traffic regardless of any client transponder plug presence in the ports 22. This internal loopback test 24 does not pay attention to line connectivity nor does it verify connectivity or hardware capability of the client transponder plugs.

In FIG. 2, the transponder 12 is an optical network facing device providing a DWDM optical signal from a transmitter 26 to the optical network 20 and receiving a DWDM optical signal from a receiver 28 from the optical network 20. The optical network 20 can include various components which are omitted for illustration purposes. From the transmitter 26, the DWDM optical signal can be combined with a channel multiplexer 30 and provided to a multiplexer switch 32, e.g., a Wavelength Selective Switch (WSS) or the like. From the multiplexer switch 32, the DWDM optical signal can traverse various components in the optical network 20 to a demultiplexer switch 34. In a conventional optical loopback test, the optical network 20 can be configured to provide an optical loopback on the line side between the switches 32, 34, e.g., either physically connecting fibers or by optical switching in hardware. The demultiplexer switch 34 provides the DWDM optical signal to a channel demultiplexer 36 which connects the DWDM optical signal to the receiver 28.

The conventional optical loopback test in FIG. 2 includes the transponder 12 receiving a loopback request (step 40-1). The transmitter 26 sends a unique trace identifier over the DWDM optical signal (step 40-2), and the optical network 20 is configured to provide the DWDM optical signal between the transmitter 26 and the receiver 28. The receiver 28 provides and reports back a line only loopback status (step 40-3). In the conventional optical loopback test in FIG. 2, the transponder 12 does not pay attention to clients during optical connection validation or loopback, and in a regenerator setup, the optical loopback running on one transponder 12 does not know the status of the mated ones.

Coordinated Loopback Test Among Mated Transceivers

Figure 3:
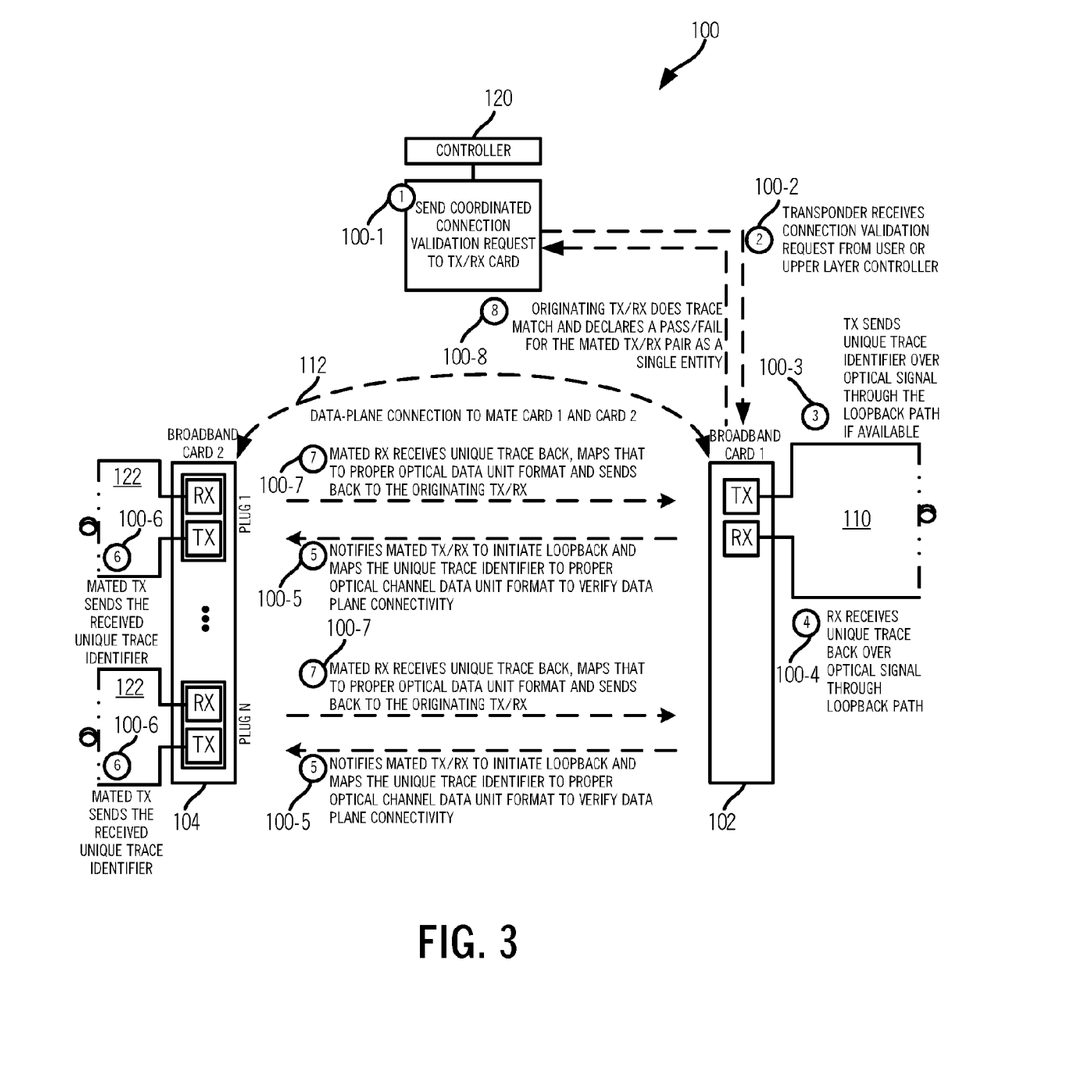
FIG. 3 is a block diagram of a coordinated loopback process between mated transceivers illustrated from the perspective of a transceiver with a single transmitter/receiver (Tx/Rx) pair.

Referring to FIG. 3, in an exemplary embodiment, a block diagram illustrates a coordinated loopback process 100 between mated transceivers 102, 104. In this example, the transceiver 102 is a first broadband card, and the transceiver 104 is a second broadband card. The transceiver 102 includes a single pair of Tx/Rx, such as a high-speed 100 Gb/s or above connection to an optical network 110. The transceiver 104 can include a plurality of Tx/Rx ports, such as lower speed interfaces or multiple high-speed interfaces. The transceivers 102, 104 can be located in the same network element with an electrical connection 112 between them, such as a backplane, midplane, etc.

The systems and methods primarily focus on coordinating optical connection validation among the mated transceivers 102, 104 (capable of transmit (Tx) and receive (Rx) optical signals) before traffic roll-out so that each transceiver 102, 104 (Tx/Rx) not only can verify their own fiber connectivity to photonic multiplexer (mux)/demultiplexer (demux) interface, but also can verify their bi-directional data plane capability and connectivity (i.e., optical-to-electrical or electrical-to-optical conversion) over the electrical connection 112. Instead of running connection validation for each transceiver 102, 104 at discrete time instants, the systems and methods allow synchronized connection validation from all transceivers 102, 104 in a mated/regeneration group so that all these mated cards can work and report connection validation status as a single entity and avoid possibilities of unseen failures at the time of traffic roll-out.

The coordinated loopback process 100 helps connection validation between the transceivers 102, 104 when the transceivers 102, 104 are not carrying live, in-service traffic. The coordinated loopback process 100 begins responsive to an optical connection validation request (step 100-1). The optical connection validation request in the example of FIG. 3 is sent to the transceiver 102. The optical connection validation request can be sent from a local or centralized controller 120, such as a Software Defined Networking (SDN) controller, a Network Management System (NMS), an Element Management System (EMS), a Craft Interface (CI), or the like. The optical connection validation request can be the result of manual user input. Also, the optical connection validation request can be via a control plane or the like.

The transceiver 102 receives the optical connection validation request from the user or from an upper layer controller/control plane (step 100-2). The transceiver 102 checks if it has any mated or paired data plane connections. In the example of FIG. 3, the transceiver 102 is paired or mated with the transceiver 104 via the electrical connection 112. Since the transceiver 102 is mated or paired, it first performs its own optical loopback test by sending (step 100-3) and receiving (step 100-4) a unique trace identifier over an optical loopback path in the optical network 110.

If the transceiver 102 receives the unique trace identifier successfully, which proves both optical connectivity and data-framing capability of the transceiver 102, the receiver on the transceiver 102 sends a notification to mated Tx/Rx card(s), i.e., the transceiver 104, via the electrical connection 112 (step 100-5). The transceiver 104 is not carrying any live traffic, and the notification maps the unique trace to a proper optical channel data unit format such as via an Optical channel Data Unit (ODU), and send that over to the mated Tx/Rx card(s), i.e., the transceiver 104, to verify the data plane capability and connectivity.

The mated Tx(s), at the other end at the transceiver 104, receive the unique trace, map that into an optical signal, and send that over an optical loopback path 122 if available to trigger its own optical connection validation (step 100-6). Once the mated Rx(s) on the transceiver 104 receive the unique trace back over the optical loopback path 122, it is sent back to the originating Tx/Rx card over the data plane in proper optical channel data unit format (step 100-7). When the originating card, i.e., the transceiver 102, receives its own unique trace over the data plane, it not only confirms successful optical connection validation and data-framing capability of each individual Tx/Rx in the mated group, but also verifies the data plane connectivity and capability between mated Tx/Rx pair(s). The transceiver 102 can provide a declaration of pass or fail of the coordinated loopback process 100, such as to the controller 120 or the like (step 100-8).

In the example of FIG. 3, the transceiver 102 has a single Tx/Rx pair whereas the transceiver 104 has a plurality of Tx/Rx pairs and the coordinated loopback process 100 is implemented from the transceiver 102 to the transceiver 104. The data plane connectivity over the electrical connection 112 can include one or more optical channels in an optical channel data unit format, such as ODU. Thus, the single Tx/Rx pair can have data plane connectivity to each of the plurality of Tx/Rx pairs. For example, the single Tx/Rx pair can have an ODU3 with multiple ODU2s to each of the plurality of Tx/Rx pairs. Other embodiments are also contemplated. Accordingly, the coordinated loopback process 100 concurrently verifies optical connectivity as well as data plane connectivity.

Figure 4:
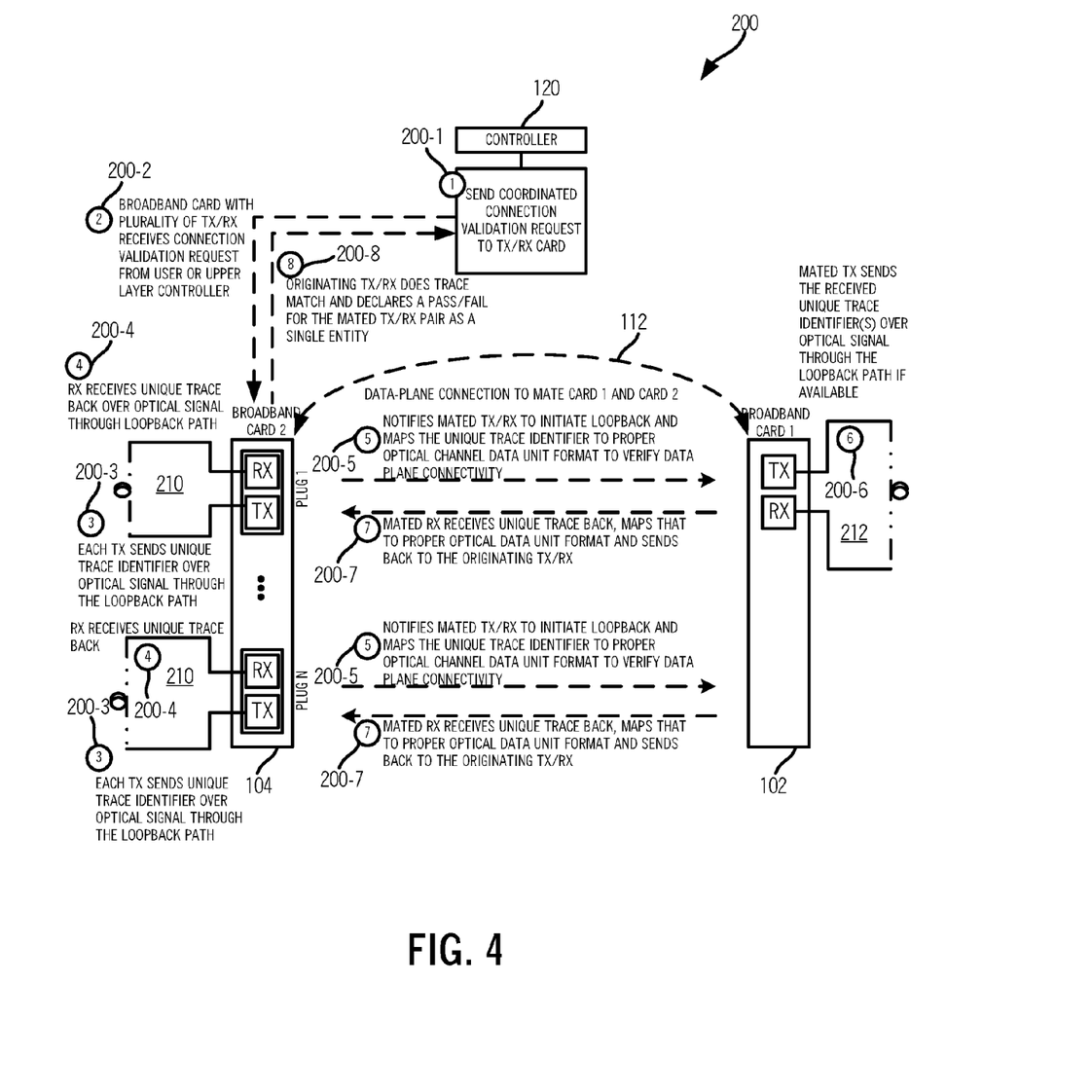
FIG. 4 is a block diagram of another coordinated loopback process between mated transceivers illustrated from the perspective of a transceiver with a multiple Tx/Rx pairs.

Referring to FIG. 4, in an exemplary embodiment, a block diagram illustrates another coordinated loopback process 200 between mated transceivers 102, 104. The coordinated loopback process 200 is similar to the coordinated loopback process 100, but illustrated from the transceiver 104 (with multiple Tx/Rx pairs) to the transceiver 102. If the paired card contains multiple Tx/Rx plugs, then the coordinated loopback process 200 is initiated for each Tx/Rx that is not engaged in carrying live traffic.

The coordinated loopback process 200 sending an optical connection validation request, such as from the controller 120 and in a similar manner as in the coordinated loopback process 100 (step 200-1). The transceiver 104 with the plurality of Tx/Rx pairs receives the optical connection validation request from a user and/or an upper layer controller (step 200-2).

Each Tx/Rx generates a unique traffic pattern and transmits the traffic over a loopback path 210 if available (step 200-3). On a successful optical loopback (step 200-4), each Rx sends their unique trace to the paired Tx/Rx along with a notification to trigger an optical loopback test (step 200-5) over the electrical connection 112. The mated Tx/Rx, at the other end at the transceiver 102), receives a plurality of unique traces, maps them to Higher Order (HO) optical channel transport unit format and sends that over its own optical loopback path 212 (step 200-6). On successful receive of the unique trace, the mated Tx/Rx sends back the unique traces to their originating Tx in the appropriate order of optical channel data unit format (step 200-7). At the originating card, successful reception of unique trace identifies from all Tx/Rx modules defines a successful connection validation test for the paired Tx/Rx group, which is then reported back to higher layer controller or user (step 200-8).

Coordinated Loopback Process Among Mated Transceivers

Figure 5:
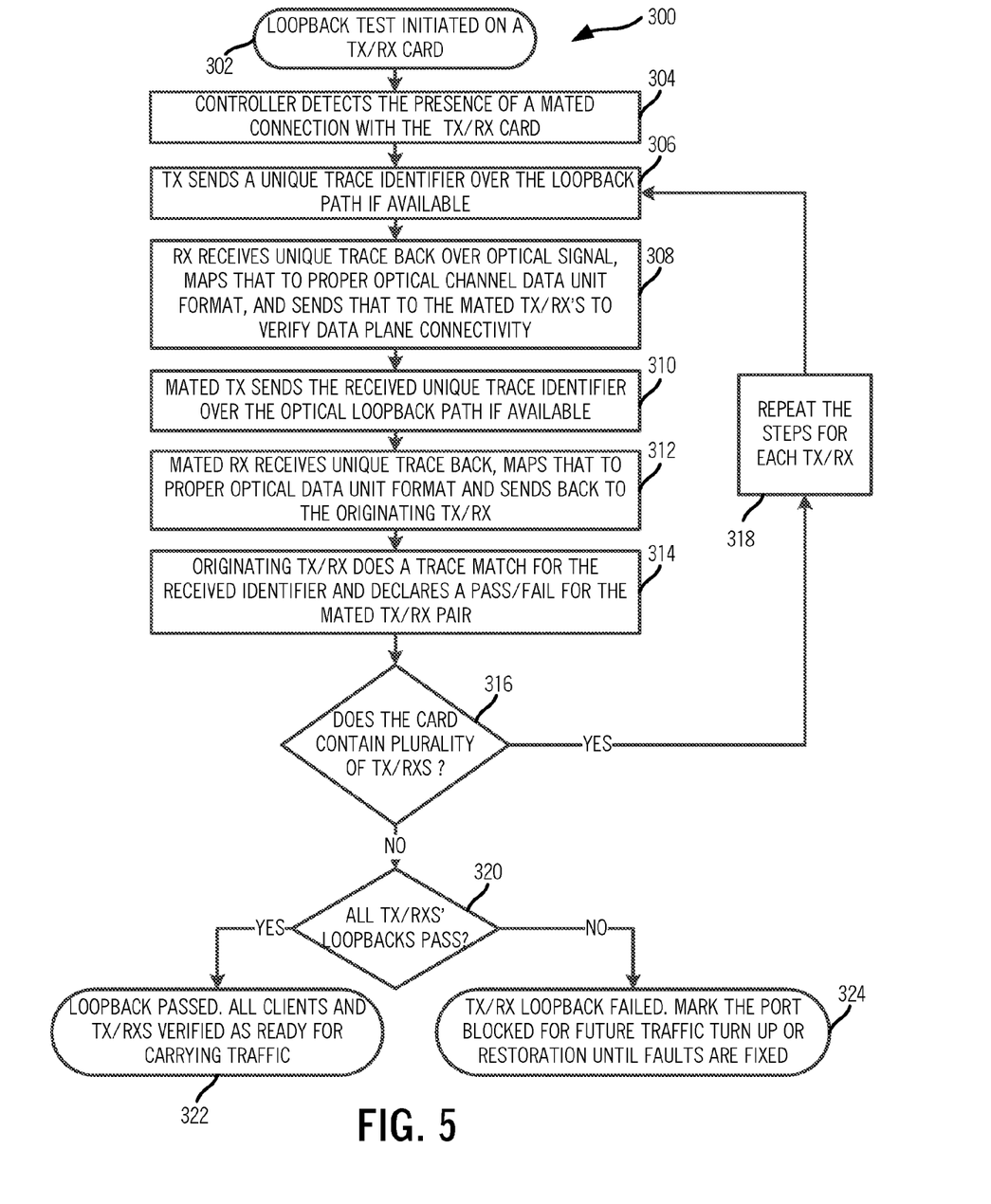
FIG. 5 is a flowchart of a coordinated loopback process among mated transceivers.

Referring to FIG. 5, in an exemplary embodiment, a flowchart illustrates a coordinated loopback process 300 among mated transceivers. The coordinated loopback process 300 is initiated for a transceiver (an originating transceiver) (step 302). A controller or the like detects the presence of a mated connection with the transceiver (step 304). This detection can be automatically detected or manually input. At the transceiver, a transmitter sends a unique trace identifier over a loopback path if available (step 306). At a receiver associated with the transceiver, the receiver receives the unique trace over an optical signal, maps that to a proper optical channel data unit formats, and sends that to the mated transceiver to verify data plane connectivity (step 308). The mated transceiver's transmitter sends the received unique trace identifier over an optical loopback path if available (step 310).

The mated transceiver's receiver receives the unique trace back, maps that to a proper optical data unit format and sends it back to the originating transceiver over an electrical connection (step 312). The originating transceiver does a trace match for the received unique trace and declares a pass or fail for the mated transceiver pair (step 314). The coordinated loopback process 300 checks if the originating transceiver has a plurality of Tx/Rx pairs (step 316), and if so, the coordinated loopback process 300 repeats steps 306-314 for each Tx/Rx pair (step 318).

If the originating transceiver does not have a plurality of Tx/Rx pairs or after all of the plurality of Tx/Rx pairs have been tested (step 316), the coordinated loopback process 300 checks if all Tx/Rx pairs have passed the loopback test (step 320). If so, the coordinated loopback process 300 has passed and all clients and Tx/Rx pairs are verified as ready for carrying traffic (step 322). If not, the coordinated loopback process 300 has failed and the associated ports can be blocked for future traffic turn up or restoration until any faults are fixed.

Exemplary Network

Figure 6:
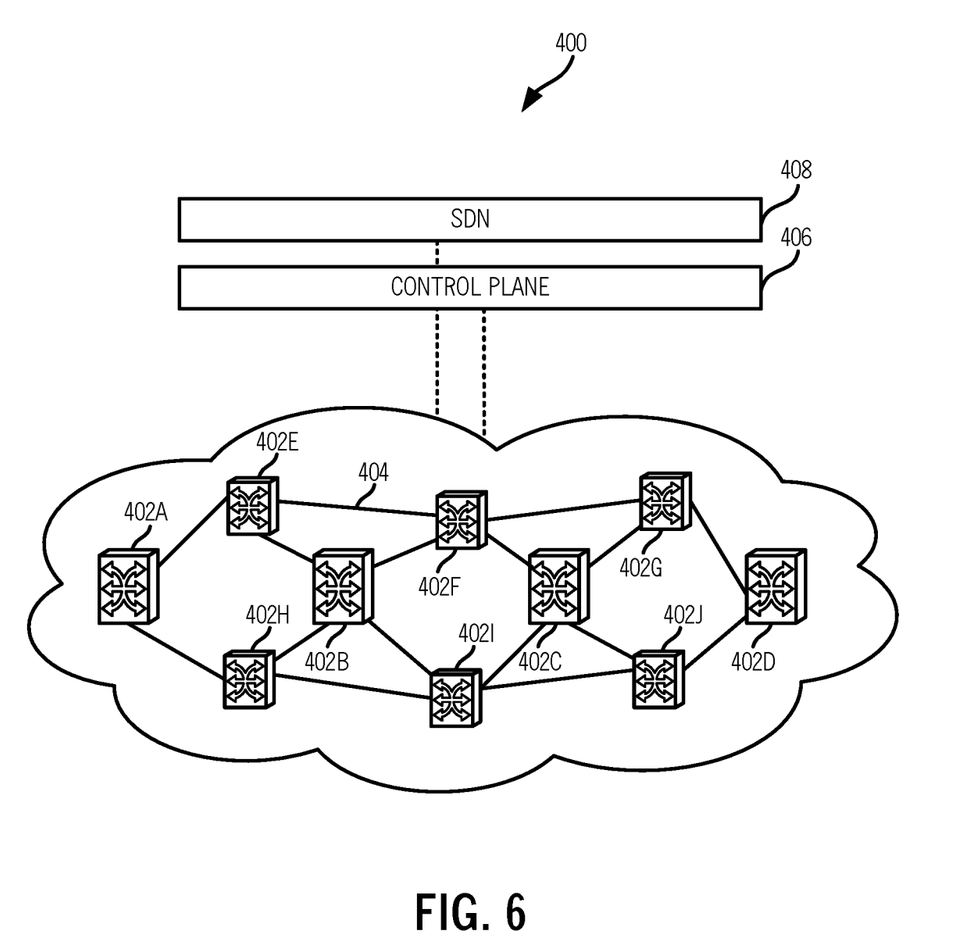
FIG. 6 is a network diagram of an exemplary network with various interconnected nodes.
Figure 7:
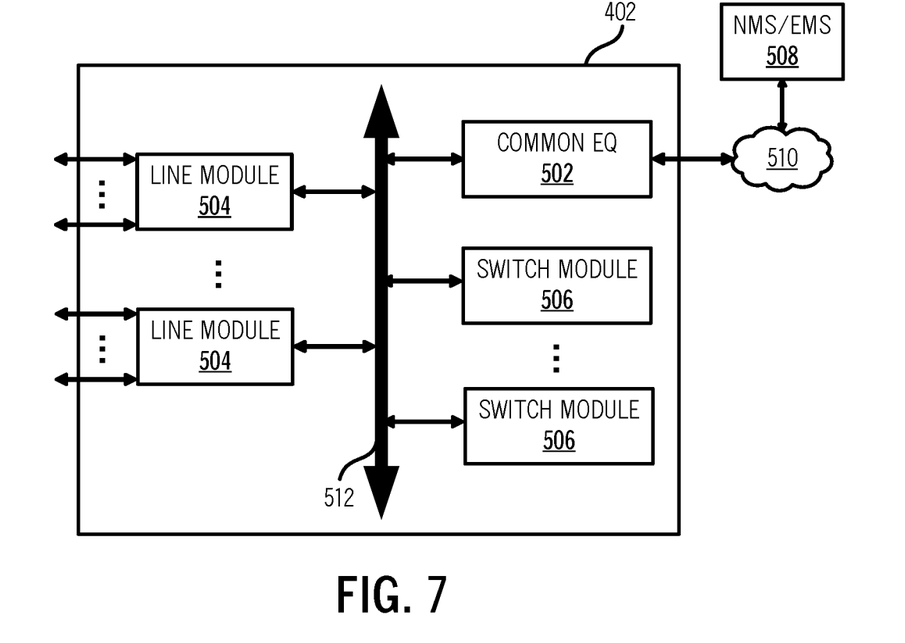
FIG. 7 is a block diagram of an exemplary node for use with the systems and methods described herein.

Referring to FIG. 6, in an exemplary embodiment, a network diagram illustrates an exemplary network 400 with various interconnected nodes 402 (illustrated as nodes 402A-402J). The nodes 402 are interconnected by a plurality of links 404. The nodes 402 communicate with one another over the links 404 through Layer 0 (L0) such as Dense Wavelength Division Multiplexing (DWDM), Layer 1 (L1) such as Optical Transport Network (OTN), Layer 2 (L2) such as Ethernet, Multiprotocol Label Switching (MPLS), etc., Layer 3 (L3) protocols, and/or combinations thereof. The nodes 402 can be network elements which include a plurality of ingress and egress ports forming the links 404. An exemplary node implementation is illustrated in FIG. 7. The network 400 can include various services or calls between the nodes 402. Each service or call can be at any of the L0, L1, L2, and/or L3 protocols, such as a wavelength, a Subnetwork Connection (SNC), a Label Switched Path (LSP), etc., and each service or call is an end-to-end path or an end-to-end signaled path and from the view of the client signal contained therein, it is seen as a single network segment. The nodes 402 can also be referred to interchangeably as network elements (NEs). The network 400 is illustrated, for example, as an interconnected mesh network, and those of ordinary skill in the art will recognize the network 400 can include other architectures, with additional nodes 402 or with fewer nodes 402, etc. as well as with various different interconnection topologies and architectures.

The network 400 can include a control plane 406 operating on and/or between the nodes 402. The control plane 406 includes software, processes, algorithms, etc. that control configurable features of the network 400, such as automated discovery of the nodes 402, capacity on the links 404, port availability on the nodes 402, connectivity between ports including optical connectivity and data plane connectivity; dissemination of topology and bandwidth information between the nodes 402; calculation and creation of paths for calls or services; network level protection and restoration; and the like. In an exemplary embodiment, the control plane 406 can utilize Automatically Switched Optical Network (ASON) as defined in G.8080/Y.1304, Architecture for the automatically switched optical network (ASON) (02/2005), the contents of which are herein incorporated by reference; Generalized Multi-Protocol Label Switching (GMPLS) Architecture as defined in Request for Comments (RFC): 3945 (10/2004) and the like, the contents of which are herein incorporated by reference; Optical Signaling and Routing Protocol (OSRP) which is an optical signaling and routing protocol from Ciena Corporation similar to PNNI (Private Network-to-Network Interface) and MPLS; or any other type control plane for controlling network elements at multiple layers, and establishing and maintaining connections between nodes. The control plane 406 is configured to establish end-to-end signaled connections such as Subnetwork Connections (SNCs) in ASON or OSRP and Label Switched Paths (LSPs) in GMPLS and MPLS. Note, as described herein, SNCs and LSPs can generally be referred to as services or calls in the control plane 406. The control plane 406 uses the available paths to route the services and programs the underlying hardware accordingly. Those of ordinary skill in the art will recognize the network 400 and the control plane 406 can utilize any type of control plane for controlling the nodes 402 and establishing, maintaining, and restoring calls or services between the nodes 402.

A Software Defined Networking (SDN) controller 408 can also be communicatively coupled to the network 400 through one or more of the nodes 402. SDN is an emerging framework which includes a centralized control plane decoupled from the data plane. SDN provides the management of network services through abstraction of lower-level functionality. This is done by decoupling the system that makes decisions about where traffic is sent (the control plane) from the underlying systems that forward traffic to the selected destination (the data plane). SDN works with the SDN controller 408 knowing a full network topology through configuration or through the use of a controller-based discovery process in the network 400. The SDN controller 408 differs from a management system in that it controls the forwarding behavior of the nodes 402 only, and performs control in real time or near real time, reacting to changes in services requested, network traffic analysis and network changes such as failure and degradation. Also, the SDN controller 408 provides a northbound interface to allow applications to access network resource information and policy-limited control over network behavior or treatment of application traffic. The SDN controller 408 sends commands to each of the nodes 402 to control matching of data flows received and actions to be taken, including any manipulation of packet contents and forwarding to specified egress ports. Examples of SDN include OpenFlow (www.opennetworking.org), General Switch Management Protocol (GSMP) defined in RFC 3294 (June 2002), and Forwarding and Control Element Separation (ForCES) defined in RFC 5810 (March 2010), the contents of all are incorporated by reference herein.

Note, the network 400 can use the control plane 406 separately from the SDN controller 408. Conversely, the network 400 can use the SDN controller 408 separately from the control plane 406. Also, the control plane 406 can operate in a hybrid control mode with the SDN controller 18. In this scheme, for example, the SDN controller 408 does not necessarily have a complete view of the network 400. Here, the control plane 4066 can be used to manage services in conjunction with the SDN controller 408. The SDN controller 408 can work in conjunction with the control plane 406 in the sense that the SDN controller 408 can make the routing decisions and utilize the control plane 406 for signaling thereof. In the terminology of ASON and OSRP, SNCs are end-to-end signaled paths or calls since from the point of view of a client signal; each is a single network segment. In GMPLS, the connections are an end-to-end path referred to as LSPs. In SDN, such as in OpenFlow, services are called "flows."

Exemplary Network Element/Node

Referring to FIG. 7, in an exemplary embodiment, a block diagram illustrates an exemplary node 402 for use with the systems and methods described herein. In an exemplary embodiment, the exemplary node 402 can be a network element that may consolidate the functionality of a Multi-Service Provisioning Platform (MSPP), Digital Cross-Connect (DCS), Ethernet and/or Optical Transport Network (OTN) switch, Wave Division Multiplexed (WDM)/Dense WDM (DWDM) platform, Packet Optical Transport System (POTS), etc. into a single, high-capacity intelligent switching system providing Layer 0, 1, 2, and/or 3 consolidation. In another exemplary embodiment, the node 402 can be any of an OTN Add/Drop Multiplexer (ADM), a Multi-Service Provisioning Platform (MSPP), a Digital Cross-Connect (DCS), an optical cross-connect, a POTS, an optical switch, a router, a switch, a Wavelength Division Multiplexing (WDM) terminal, an access/aggregation device, etc. That is, the node 402 can be any digital system with ingress and egress digital signals and switching of channels, timeslots, tributary units, etc. While the node 402 is generally shown as an optical network element, the systems and methods contemplated for use with any switching fabric, network element, or network based thereon.

In an exemplary embodiment, the node 402 includes common equipment 502, one or more line modules 504, and one or more switch modules 506. The common equipment 502 can include power; a control module; operations, administration, maintenance, and provisioning (OAM&P) access; user interface ports; and the like. The common equipment 502 can connect to a management system 508 through a data communication network 510 (as well as a Path Computation Element (PCE), SDN controller, OpenFlow controller, etc.). The management system 508 can include a network management system (NMS), element management system (EMS), or the like. Additionally, the common equipment 502 can include a control plane processor, such as a controller 600 illustrated in FIG. 8 configured to operate the control plane as described herein. The node 402 can include an interface 512 for communicatively coupling the common equipment 502, the line modules 504, and the switch modules 506 to one another. For example, the interface 512 can be a backplane, midplane, a bus, optical or electrical connectors, or the like. In the systems and methods, the interface 512 can form part of the electrical connections 112. The line modules 504 are configured to provide ingress and egress to the switch modules 506 and to external connections on the links to/from the node 402. In an exemplary embodiment, the line modules 504 can form ingress and egress switches with the switch modules 506 as center stage switches for a three-stage switch, e.g. a three-stage Clos switch. Other configurations and/or architectures are also contemplated. The line modules 504 can include optical transceivers, such as, for example, 1 Gb/s (GbE PHY), 2.5 GB/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), ODUflex, Flexible Ethernet, etc.

Further, the line modules 504 can include a plurality of optical connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s, N×1.25 Gb/s, and any rate in between as well as future higher rates. The line modules 504 can include wavelength division multiplexing interfaces, short reach interfaces, and the like, and can connect to other line modules 504 on remote network elements, end clients, edge routers, and the like, e.g. forming connections on the links in the network 400. From a logical perspective, the line modules 504 provide ingress and egress ports to the node 402, and each line module 504 can include one or more physical ports. The switch modules 506 are configured to switch channels, timeslots, tributary units, packets, etc. between the line modules 504. For example, the switch modules 506 can provide wavelength granularity (Layer 0 switching); OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical Channel Data Unit-flex (ODUflex), Optical channel Payload Virtual Containers (OPVCs), ODTUGs, etc.; Ethernet granularity; and the like. Specifically, the switch modules 506 can include Time Division Multiplexed (TDM) (i.e., circuit switching) and/or packet switching engines. The switch modules 506 can include redundancy as well, such as 1:1, 1:N, etc. In an exemplary embodiment, the switch modules 506 provide OTN switching and/or Ethernet switching.

Those of ordinary skill in the art will recognize the node 402 can include other components which are omitted for illustration purposes, and that the systems and methods described herein are contemplated for use with a plurality of different network elements with the node 402 presented as an exemplary type of network element. For example, in another exemplary embodiment, the node 402 may not include the switch modules 506, but rather have the corresponding functionality in the line modules 504 (or some equivalent) in a distributed fashion. For the node 402, other architectures providing ingress, egress, and switching are also contemplated for the systems and methods described herein. In general, the systems and methods described herein contemplate use with any network element providing switching of channels, timeslots, tributary units, wavelengths, etc. and using the control plane. Furthermore, the node 402 is merely presented as one exemplary node 402 for the systems and methods described herein. In the systems and methods described herein, the transceivers 102, 104 can be part of the line modules 504 and the electrical connection 112 can include the interface 512 and the switch modules 506.

Exemplary Controller

Figure 8:
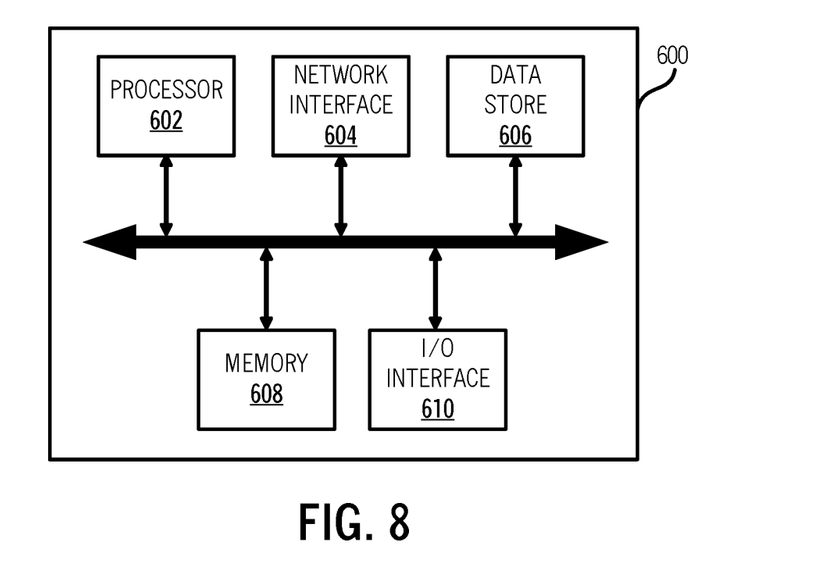
FIG. 8 is a block diagram of a controller to provide control plane processing and/or operations, administration, maintenance, and provisioning (OAM&P) for the node of FIG. 7, and/or to implement a Software Defined Networking (SDN) controller.

Referring to FIG. 8, in an exemplary embodiment, a block diagram illustrates a controller 50 to provide control plane processing and/or operations, administration, maintenance, and provisioning (OAM&P) for the node 402, and/or to implement a Software Defined Networking (SDN) controller. The controller 600 can be part of the common equipment, such as common equipment 502 in the node 402, or a stand-alone device communicatively coupled to the node 402 via the DCN 510. In a stand-alone configuration, the controller 600 can be an SDN controller, an NMS, a PCE, etc. The controller 600 can include a processor 602 which is a hardware device for executing software instructions such as operating the control plane. The processor 602 can be any custom made or commercially available processor, a central processing unit (CPU), an auxiliary processor among several processors associated with the controller 600, a semiconductor-based microprocessor (in the form of a microchip or chip set), or generally any device for executing software instructions. When the controller 600 is in operation, the processor 602 is configured to execute software stored within the memory, to communicate data to and from the memory, and to generally control operations of the controller 600 pursuant to the software instructions. The controller 600 can also include a network interface 604, a data store 606, memory 608, an I/O interface 610, and the like, all of which are communicatively coupled to one another and to the processor 602.

The network interface 604 can be used to enable the controller 600 to communicate on the DCN 510, such as to communicate control plane information to other controllers, to the management system 508, to the nodes 402, and the like. The network interface 604 can include, for example, an Ethernet card or a wireless local area network (WLAN) card. The network interface 604 can include address, control, and/or data connections to enable appropriate communications on the network. The data store 606 can be used to store data, such as control plane information, provisioning data, OAM&P data, etc. The data store 606 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 606 can incorporate electronic, magnetic, optical, and/or other types of storage media. The memory 608 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 608 may incorporate electronic, magnetic, optical, and/or other types of storage media. Note that the memory 608 can have a distributed architecture, where various components are situated remotely from one another, but may be accessed by the processor 602. The I/O interface 610 includes components for the controller 600 to communicate with other devices. Further, the I/O interface 610 includes components for the controller 600 to communicate with the other nodes, such as using overhead associated with OTN signals.

In an exemplary embodiment, the controller 600 is configured to communicate with other controllers 600 in the network 400 to operate the control plane for control plane signaling. This communication may be either in-band or out-of-band. For SONET networks and similarly for SDH networks, the controllers 600 may use standard or extended SONET line (or section) overhead for in-band signaling, such as the Data Communications Channels (DCC). Out-of-band signaling may use an overlaid Internet Protocol (IP) network such as, for example, User Datagram Protocol (UDP) over IP. In an exemplary embodiment, the controllers 600 can include an in-band signaling mechanism utilizing OTN overhead. The General Communication Channels (GCC) defined by ITU-T Recommendation G.709 are in-band side channels used to carry transmission management and signaling information within Optical Transport Network elements. The GCC channels may be used for in-band signaling or routing to carry control plane traffic. Other mechanisms are also contemplated for control plane signaling as well as for SDN controller communication.

The controller 600 is configured to operate the control plane 406 in the network 400. That is, the controller 600 is configured to implement software, processes, algorithms, etc. that control configurable features of the network 400, such as automating discovery of the nodes, capacity on the links, port availability on the nodes, connectivity between ports including optical connectivity and data plane connectivity; dissemination of topology and bandwidth information between the nodes; path computation and creation for connections; network level protection and restoration; and the like. As part of these functions, the controller 600 can include a topology database that maintains the current topology of the network 400 based on control plane signaling (e.g., HELLO messages) and a connection database that maintains available bandwidth on the links 404 again based on the control plane signaling. Again, the control plane is a distributed control plane; thus, a plurality of the controllers 600 can act together to operate the control plane using the control plane signaling to maintain database synchronization. In source-based routing, the controller 600 at a source node for a connection is responsible for path computation and establishing by signaling other controllers 600 in the network 400, such as through a SETUP message. For example, the source node and its controller 600 can signal a path through various techniques. As described herein, the connection refers to a signaled, end-to-end connection such as an SNC, SNCP, LSP, etc. which are generally a service. Path computation generally includes determining a path, i.e. traversing the links through the nodes from the originating node to the destination node based on a plurality of constraints such as administrative weights on the links, bandwidth availability on the links, etc.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method for connection validation between a pair of mated transceivers implemented in a network element, the method comprising:

responsive to a request for connection validation at a first transceiver of the pair of mated transceivers, performing a first optical loopback test through the first transceiver with a unique trace identifier;

responsive to a successful first optical loopback test, providing the unique trace identifier to a second transceiver of the mated transceivers with a request for a second optical loopback test;

performing the second optical loopback test through the second transceiver with the unique trace identifier;

responsive to a successful second optical loopback test, providing the unique trace identifier back to the first transceiver from the second transceiver; and responsive to one or more of a failure in the first optical loopback test, a failure in the providing, and a failure in the second optical loopback test, blocking the mated transceivers for future traffic.

2. The method of claim 1, wherein the first transceiver comprises a plurality of transmitter/receiver (Tx/Rx) pairs, and wherein the first optical loopback test and the providing is performed for each of the plurality of Tx/Rx pairs.

3. The method of claim 2, wherein the each of the plurality of Tx/Rx pairs transmits a low transmission rate signal, and wherein the second transceiver transmits a high transmission rate signal.

4. The method of claim 1, wherein the second transceiver comprises a plurality of transmitter/receiver (Tx/Rx) pairs, and wherein the providing is performed to each of the plurality of Tx/Rx pairs which each perform a separate second optical loopback test.

5. The method of claim 4, wherein the each of the plurality of Tx/Rx pairs transmits a low transmission rate signal, and wherein the first transceiver transmits a high transmission rate signal.

6. The method of claim 1, wherein the providing utilizes an Optical channel Data Unit with the unique trace identifier to verify the data plane connectivity between the mated transceivers.

7. The method of claim 1, wherein the mated transceivers are managed as a single entity for traffic provisioning.

8. The method of claim 1, wherein the first transceiver and the second transceiver are each disposed in a same network element with the providing over an electrical interface between the first transceiver and the second transceiver.

9. An apparatus adapted for connection validation between a pair of mated transceivers implemented in a network element, the apparatus comprising:

circuitry adapted to cause performance of a first optical loopback test through the first transceiver with a unique trace identifier responsive to a request for connection validation at a first transceiver of the pair of mated transceivers;

circuitry adapted to provide the unique trace identifier to a second transceiver of the mated transceivers with a request for a second optical loopback test responsive to a successful first optical loopback test;

circuitry adapted to cause performance of the second optical loopback test through the second transceiver with the unique trace identifier;

circuitry adapted to provide the unique trace identifier back to the first transceiver from the second transceiver responsive to a successful second optical loopback test; and circuitry adapted to block the mated transceivers for future traffic responsive to one or more of a failure in the first optical loopback test, a failure in the providing, and a failure in the second optical loopback test.

10. The apparatus of claim 9, wherein the first transceiver comprises a plurality of transmitter/receiver (Tx/Rx) pairs, and wherein the first optical loopback test and the providing is performed for each of the plurality of Tx/Rx pairs.

11. The apparatus of claim 10, wherein the each of the plurality of Tx/Rx pairs transmits a low transmission rate signal, and wherein the second transceiver transmits a high transmission rate signal.

12. The apparatus of claim 9, wherein the second transceiver comprises a plurality of transmitter/receiver (Tx/Rx) pairs, and wherein the circuitry adapted to provide is configured to provide the unique trace identifier to each of the plurality of Tx/Rx pairs which each perform a separate second optical loopback test.

13. The apparatus of claim 12, wherein the each of the plurality of Tx/Rx pairs transmits a low transmission rate signal, and wherein the first transceiver transmits a high transmission rate signal.

14. The apparatus of claim 9, wherein the circuitry adapted to provide utilizes an Optical channel Data Unit with the unique trace identifier to verify the data plane connectivity between the mated transceivers.

15. The apparatus of claim 9, wherein the mated transceivers are managed as a single entity for traffic provisioning.

16. The apparatus of claim 9, wherein the first transceiver and the second transceiver are each disposed in a same network element with the providing over an electrical interface between the first transceiver and the second transceiver.

17. A network element adapted for connection validation between a pair of mated transceivers, the network element comprising:
a plurality of line modules interconnected to one another; and
a controller configured to
responsive to a request for connection validation at a first line module of the pair of mated transceivers, perform a first optical loopback test through the first line module with a unique trace identifier,
responsive to a successful first optical loopback test, provide the unique trace identifier to a second line module of the mated transceivers with a request for a second optical loopback test,
perform the second optical loopback test through the second line module with the unique trace identifier,
responsive to a successful second optical loopback test, provide a notification to the first line module from the second line module, and
block the mated transceivers for future traffic responsive to one or more of a failure in the first optical loopback test and a failure in the second optical loopback test.

\* \* \* \* \*